(12) United States Patent
Ichieda

(10) Patent No.: US 11,131,911 B2
(45) Date of Patent: Sep. 28, 2021

(54) PROJECTOR AND METHOD FOR CONTROLLING PROJECTOR

(71) Applicant: SEIKO EPSON CORPORATION, Tokyo (JP)

(72) Inventor: Hiroyuki Ichieda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 104 days.

(21) Appl. No.: 16/496,393

(22) PCT Filed: Mar. 6, 2018

(86) PCT No.: PCT/JP2018/008526
§ 371 (c)(1),
(2) Date: Sep. 20, 2019

(87) PCT Pub. No.: WO2018/173739
PCT Pub. Date: Sep. 27, 2018

(65) Prior Publication Data
US 2021/0109428 A1    Apr. 15, 2021

(30) Foreign Application Priority Data
Mar. 23, 2017 (JP) .............................. JP2017-057144

(51) Int. Cl.
*G03B 21/14* (2006.01)
(52) U.S. Cl.
CPC ......... *G03B 21/145* (2013.01); *G03B 21/142* (2013.01); *G03B 21/147* (2013.01)
(58) Field of Classification Search
CPC .... G03B 21/14; G03B 21/142; G03B 21/147; H04N 9/31; H04N 9/3147

USPC ...................................... 353/69, 70; 348/747
See application file for complete search history.

(56) References Cited

U.S. PATENT DOCUMENTS

| 9,426,436 B2 * | 8/2016 | Nakashin ............. H04N 9/3185 |
| 2006/0038962 A1 * | 2/2006 | Matsumoto .......... H04N 9/3185 |
| | | 353/69 |
| 2007/0097328 A1 * | 5/2007 | Li ......................... G02B 7/365 |
| | | 353/70 |

(Continued)

FOREIGN PATENT DOCUMENTS

| JP | 2006-060447 A | 3/2006 |
| JP | 2006-098789 A | 4/2006 |

(Continued)

OTHER PUBLICATIONS

Jun. 5, 2018 International Search Report issued in International Patent Application No. PCT/JP2018/008526.

*Primary Examiner* — William C. Dowling
(74) *Attorney, Agent, or Firm* — Oliff PLC

(57) ABSTRACT

A technique can reduce the time and effort of a user to project a projection image in a projection area on a projection surface. A projector includes: a projection unit projecting a projection image onto a projection surface; an image pickup unit picking up an image of the projection surface and generating a picked-up image; a detection unit detecting a position of a removable object arranged at the projection surface, based on the picked-up image; and an adjustment unit adjusting a projection position of the projection image on the projection surface, based on the position of the object.

11 Claims, 13 Drawing Sheets

(56) References Cited

U.S. PATENT DOCUMENTS

2009/0207185 A1\* 8/2009 Furui .................. H04N 9/3185
   345/619
2020/0007813 A1\* 1/2020 Ichieda ................ G03B 21/142

FOREIGN PATENT DOCUMENTS

JP   2007-036482 A   2/2007
JP   2015-011282 A   1/2015

\* cited by examiner

[Fig. 1]
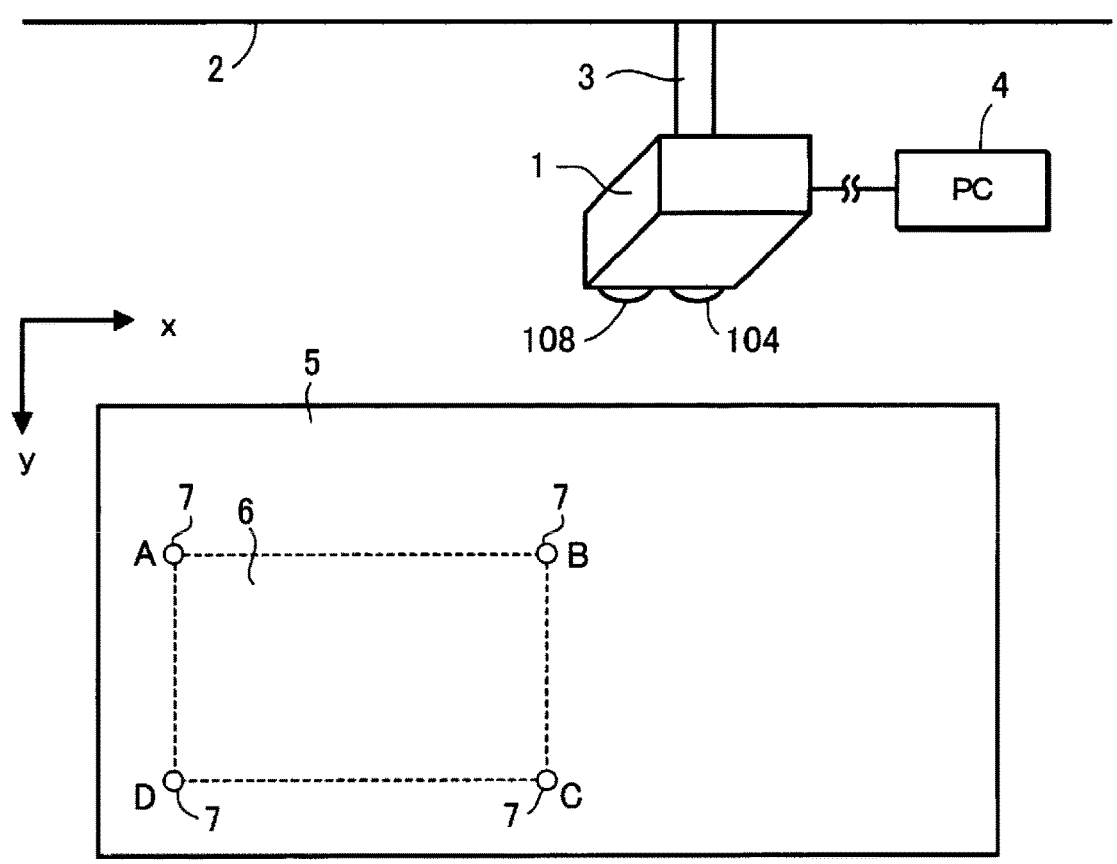

[Fig. 2]
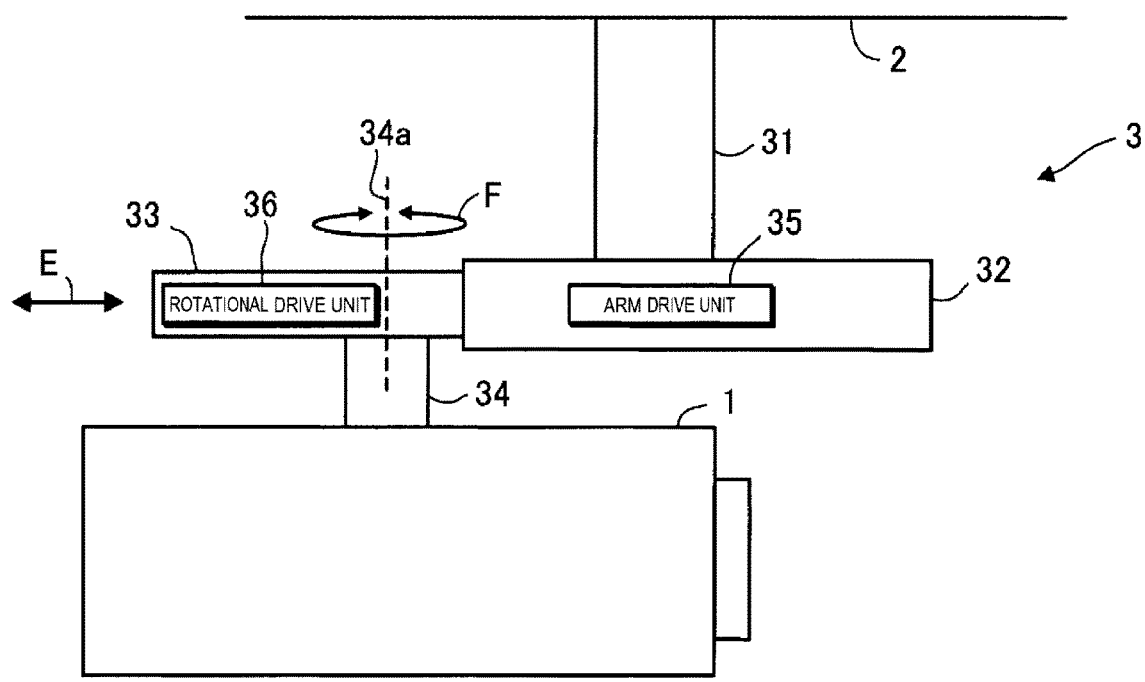

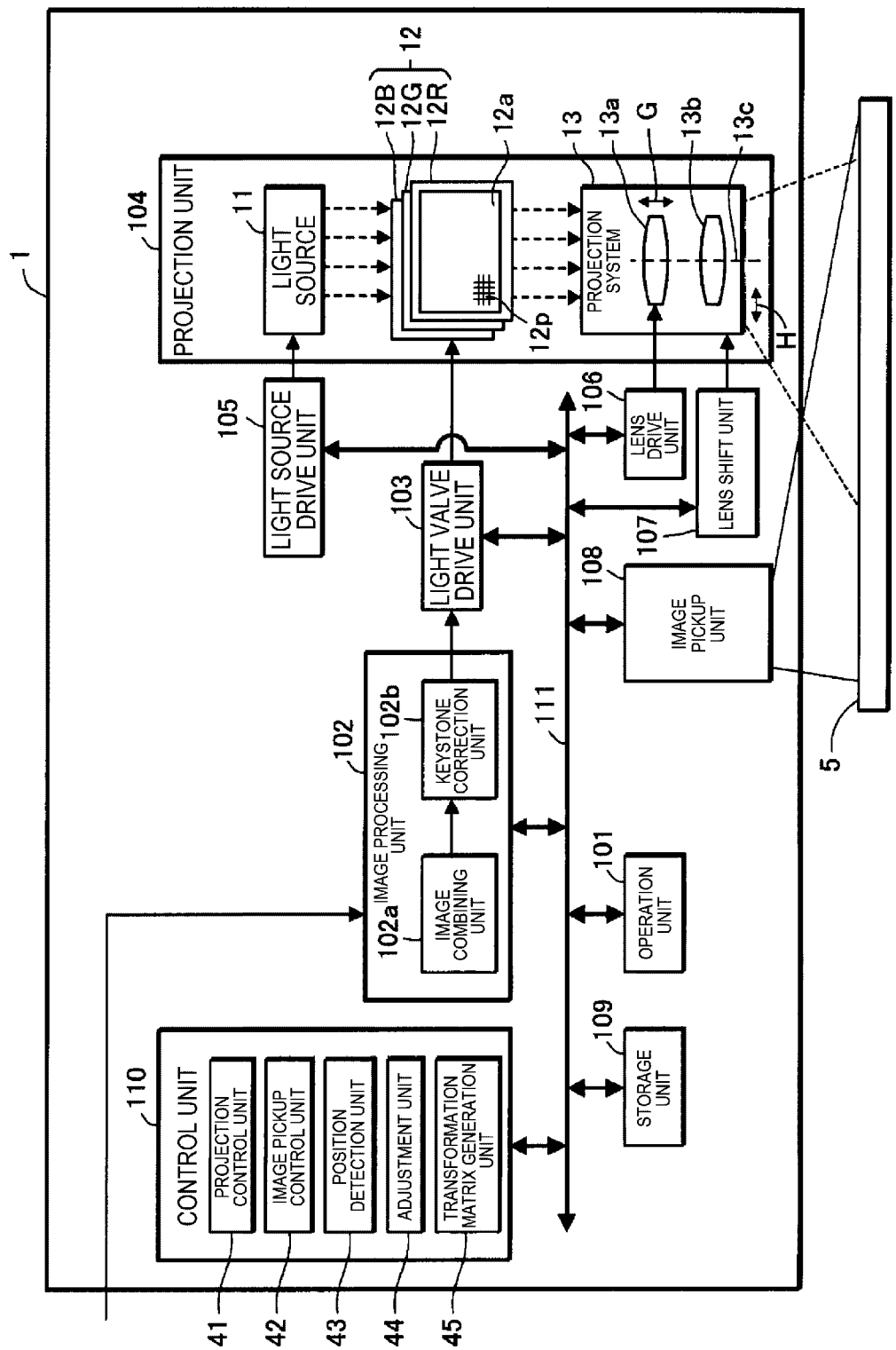
[Fig. 3]

[Fig. 4]
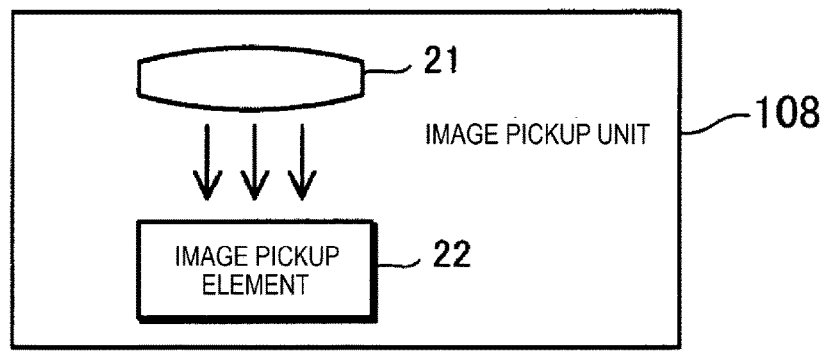
[Fig. 5]
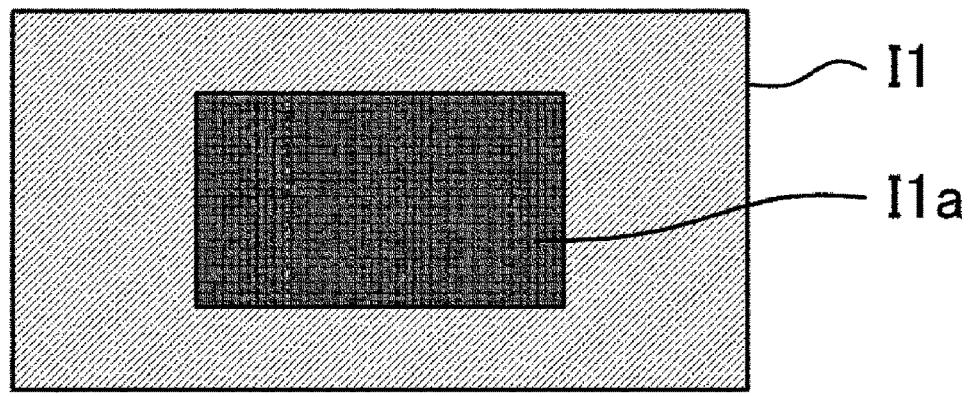
[Fig. 6]
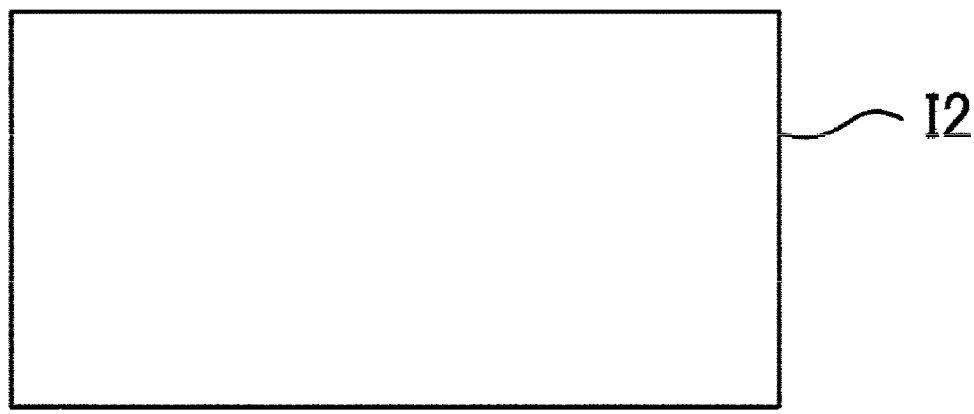

[Fig. 7]
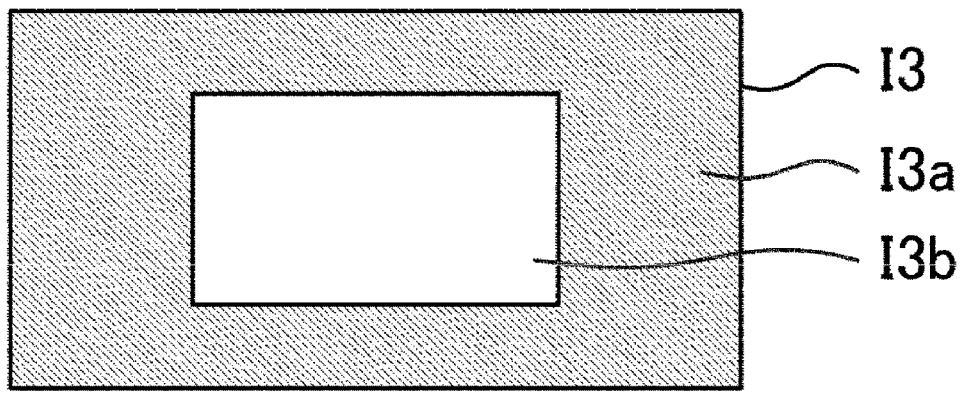
[Fig. 8]
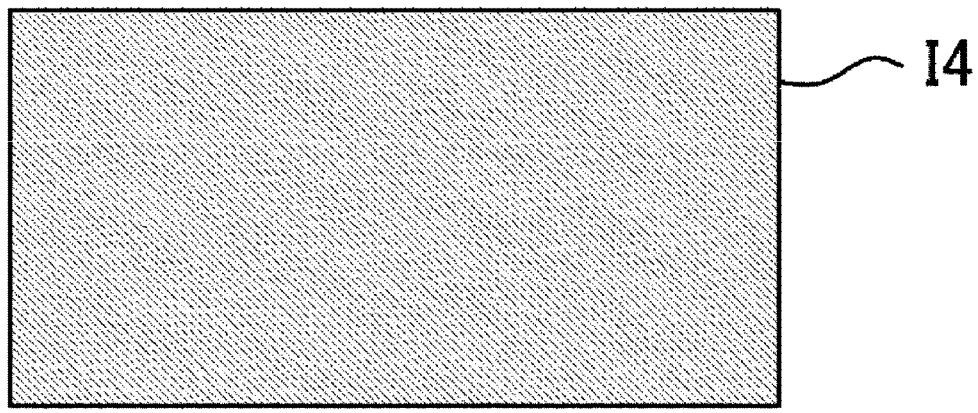
[Fig. 9]
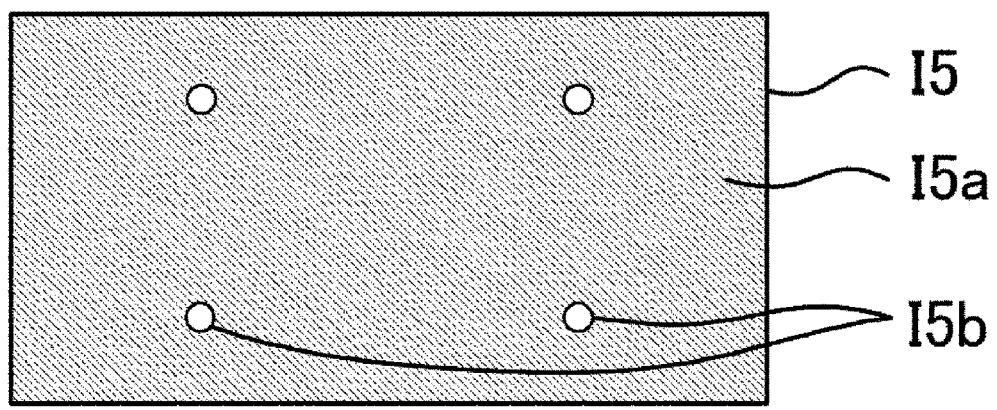

[Fig. 10]
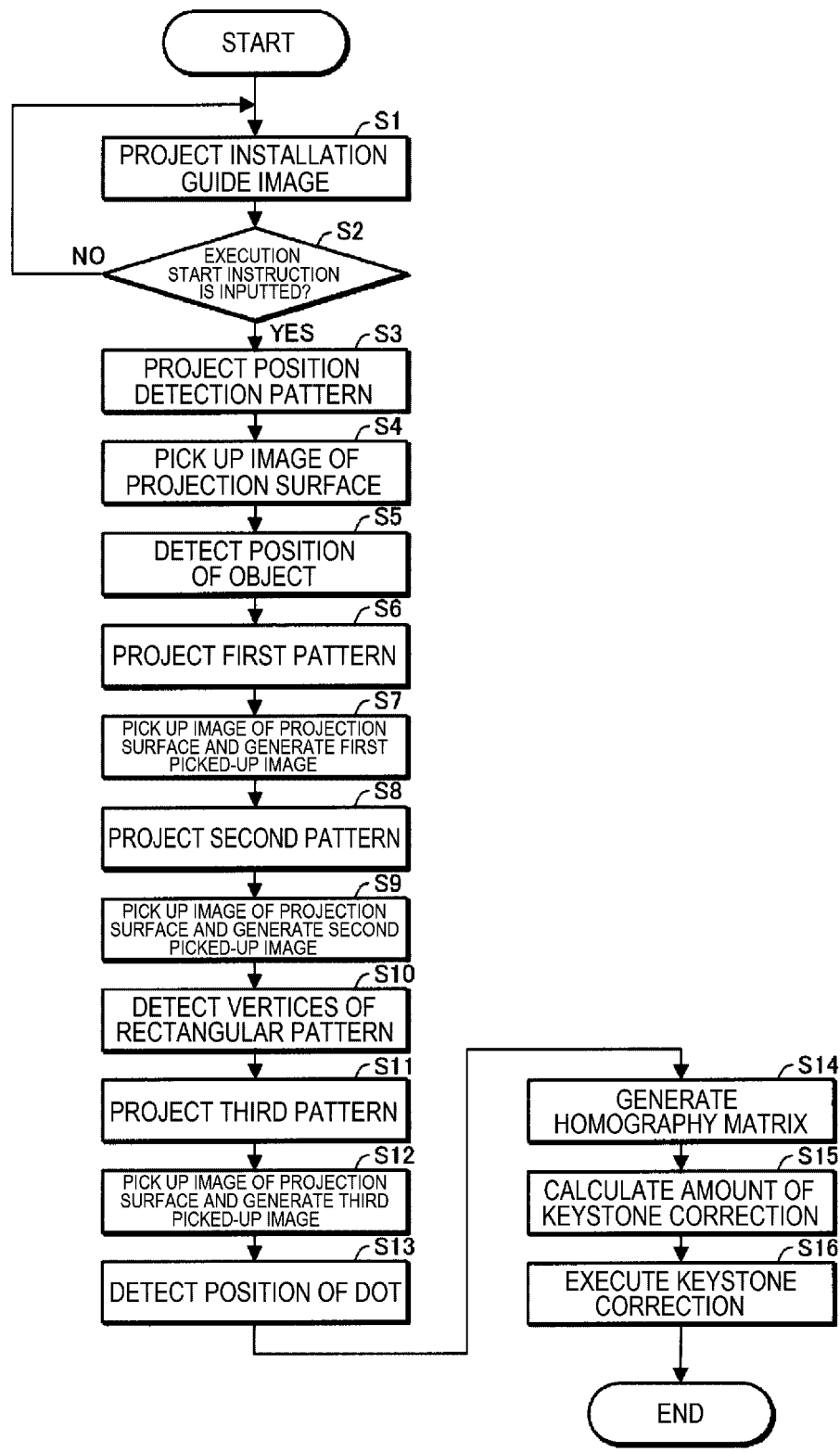

[Fig. 11]
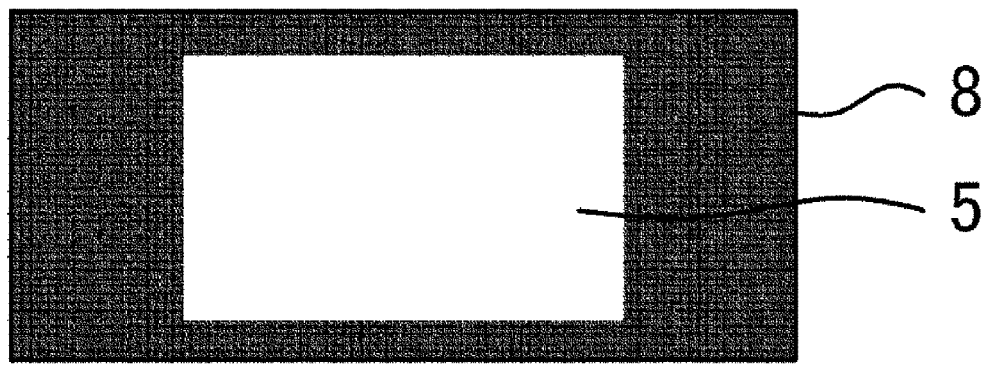
[Fig. 12]
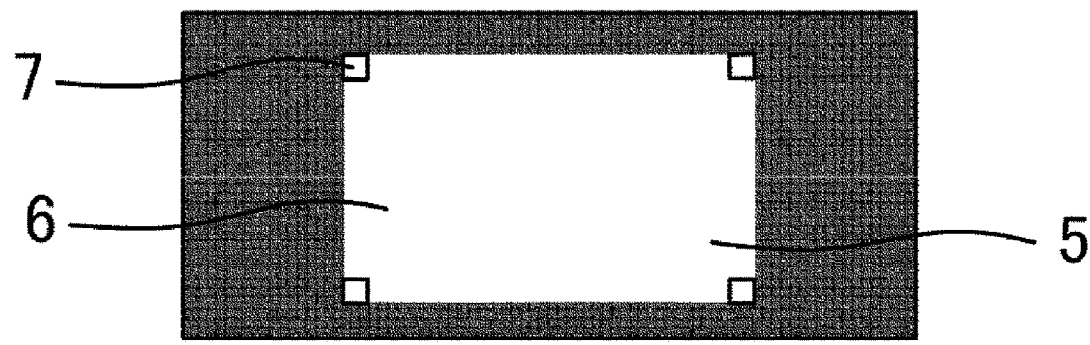
[Fig. 13]
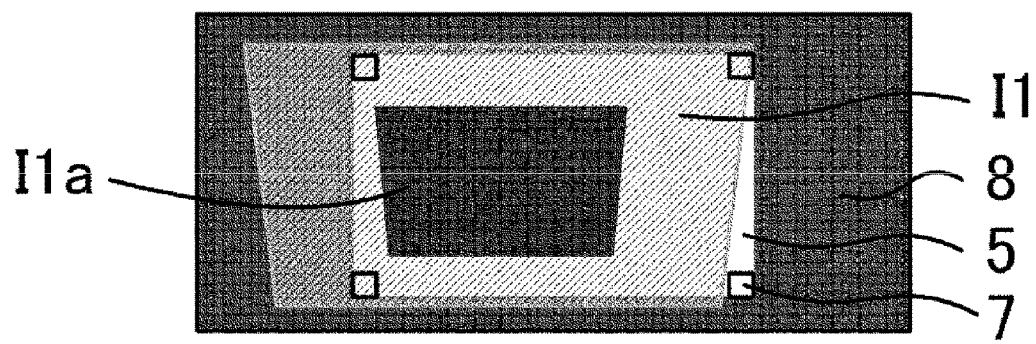

[Fig. 14]
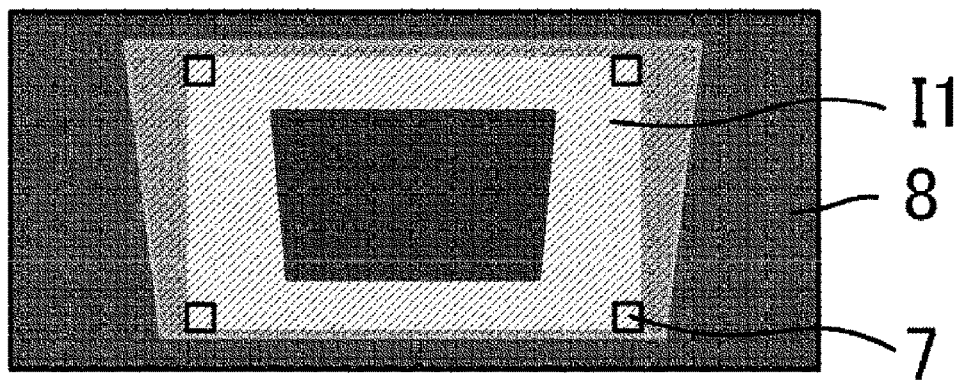
[Fig. 15]
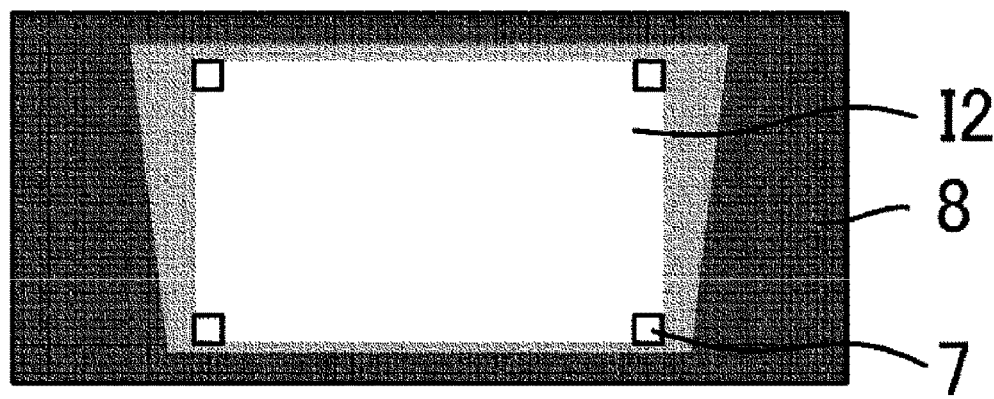
[Fig. 16]
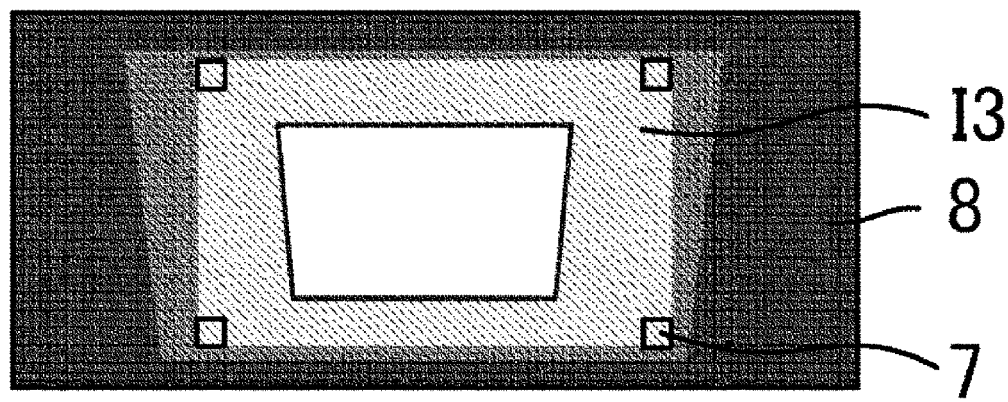

[Fig. 17]
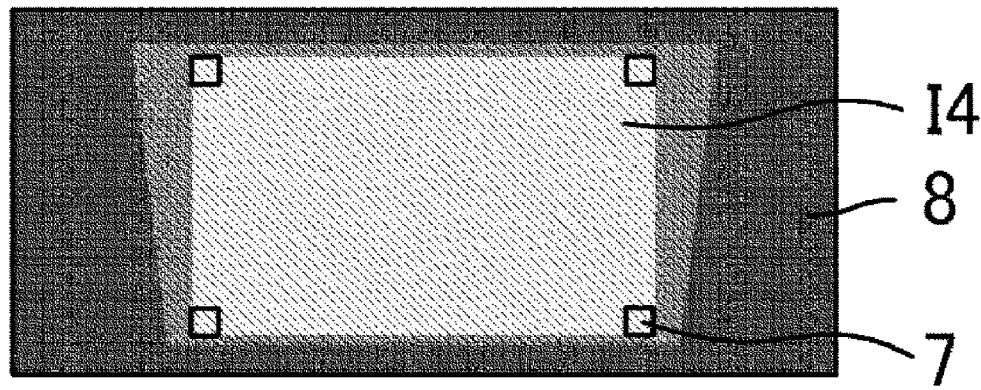
[Fig. 18]
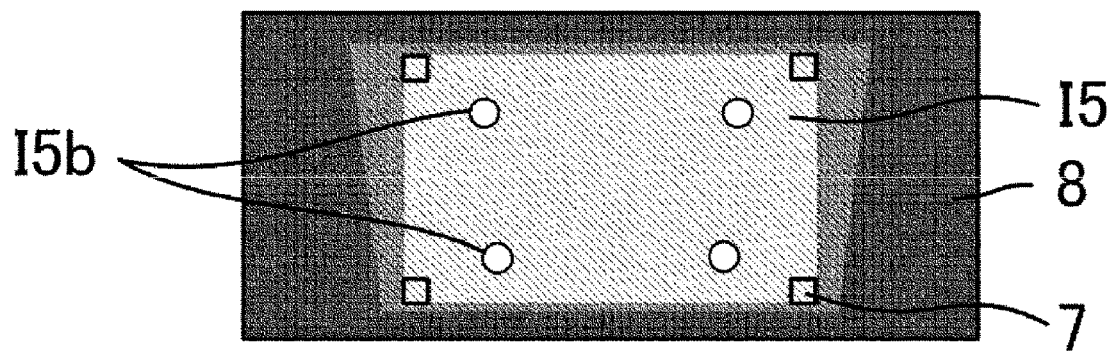
[Fig. 19]
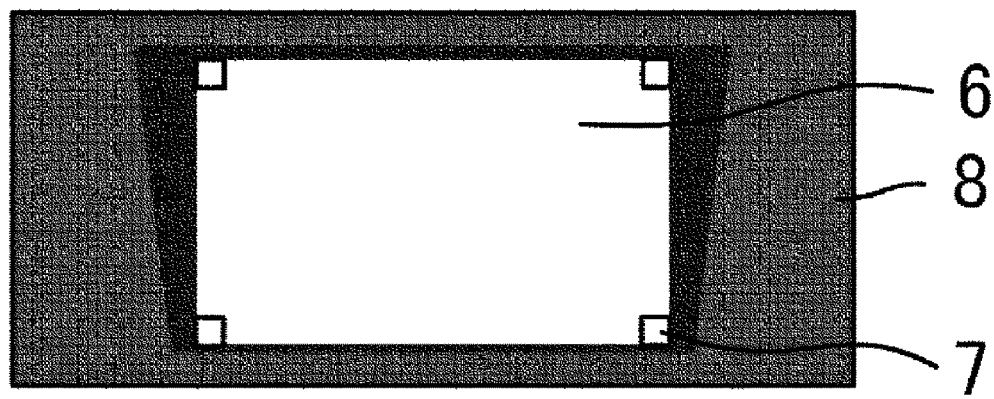

[Fig. 20]
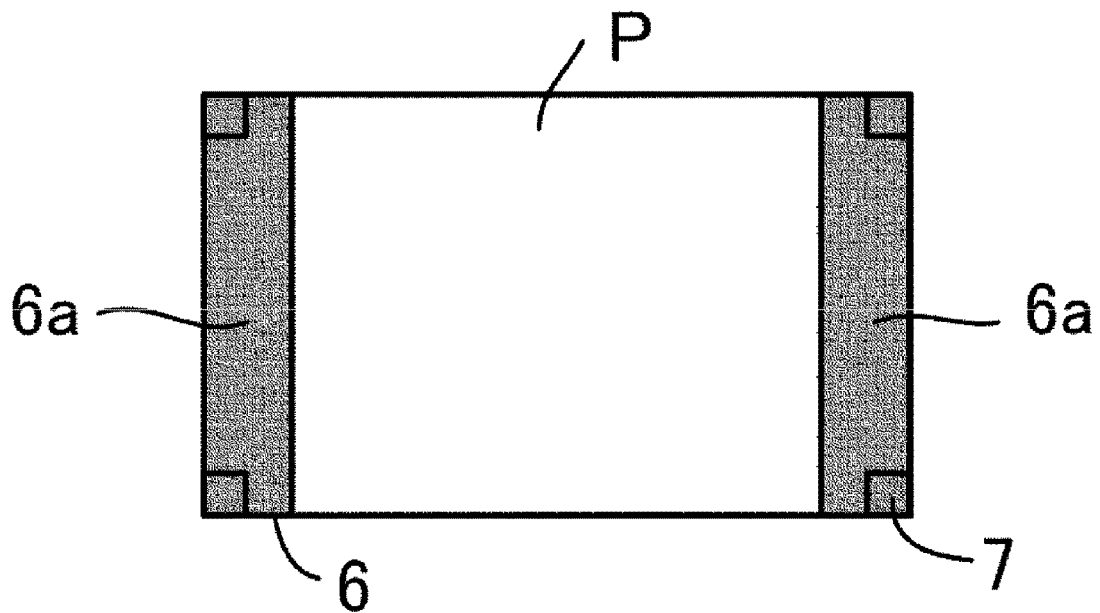
[Fig. 21]
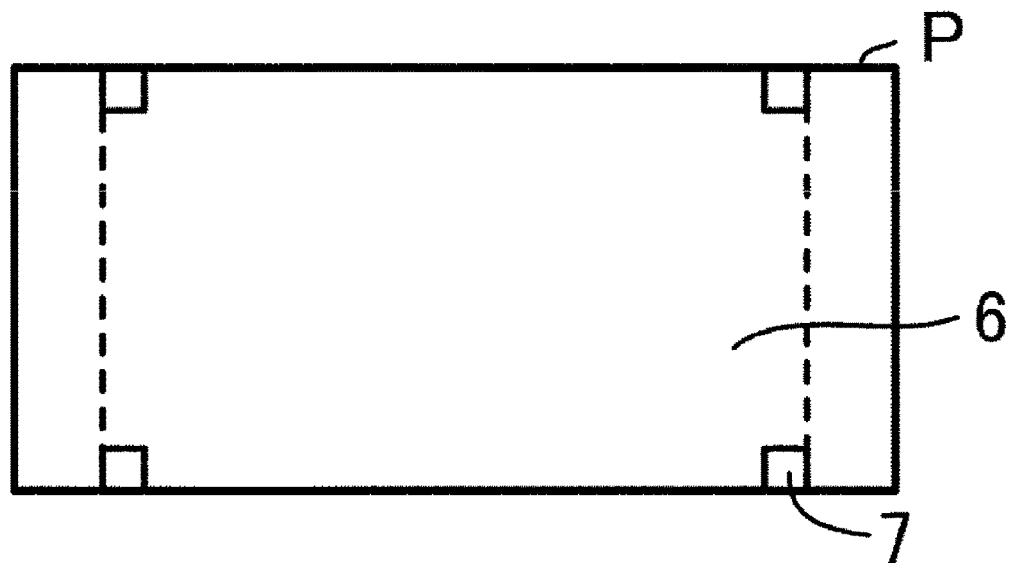

[Fig. 22]
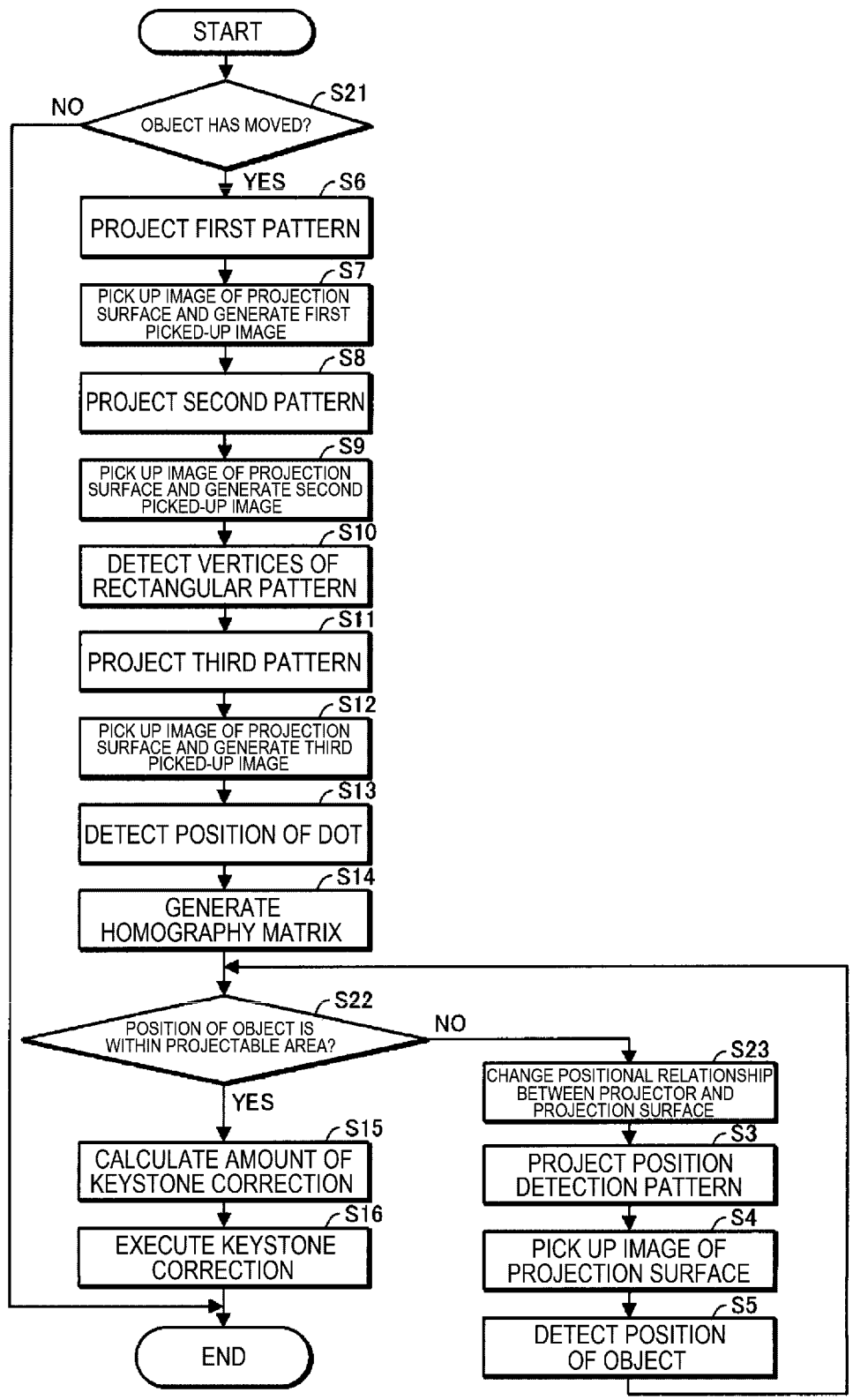

[Fig. 23]
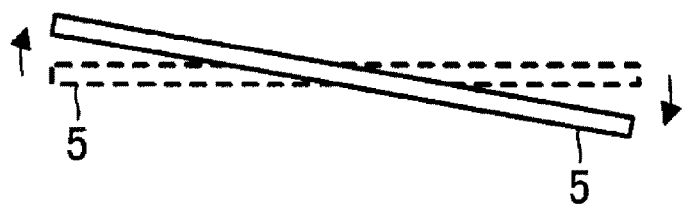
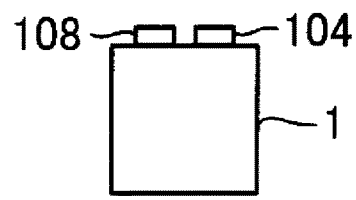
[Fig. 24]
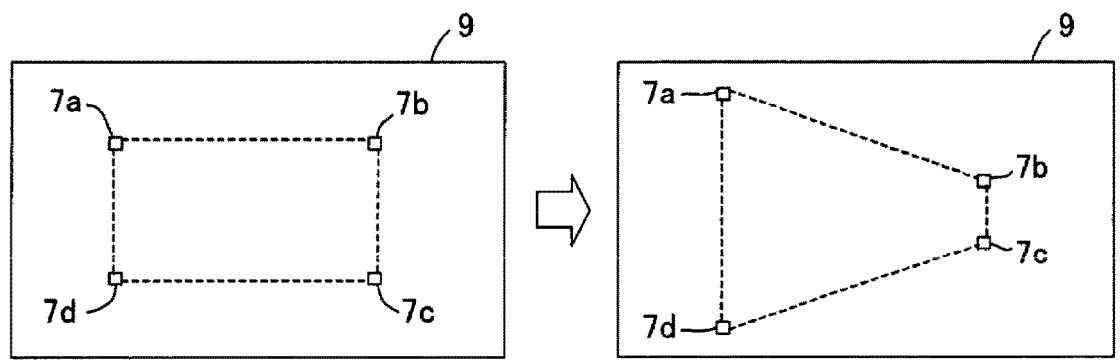

[Fig. 25]
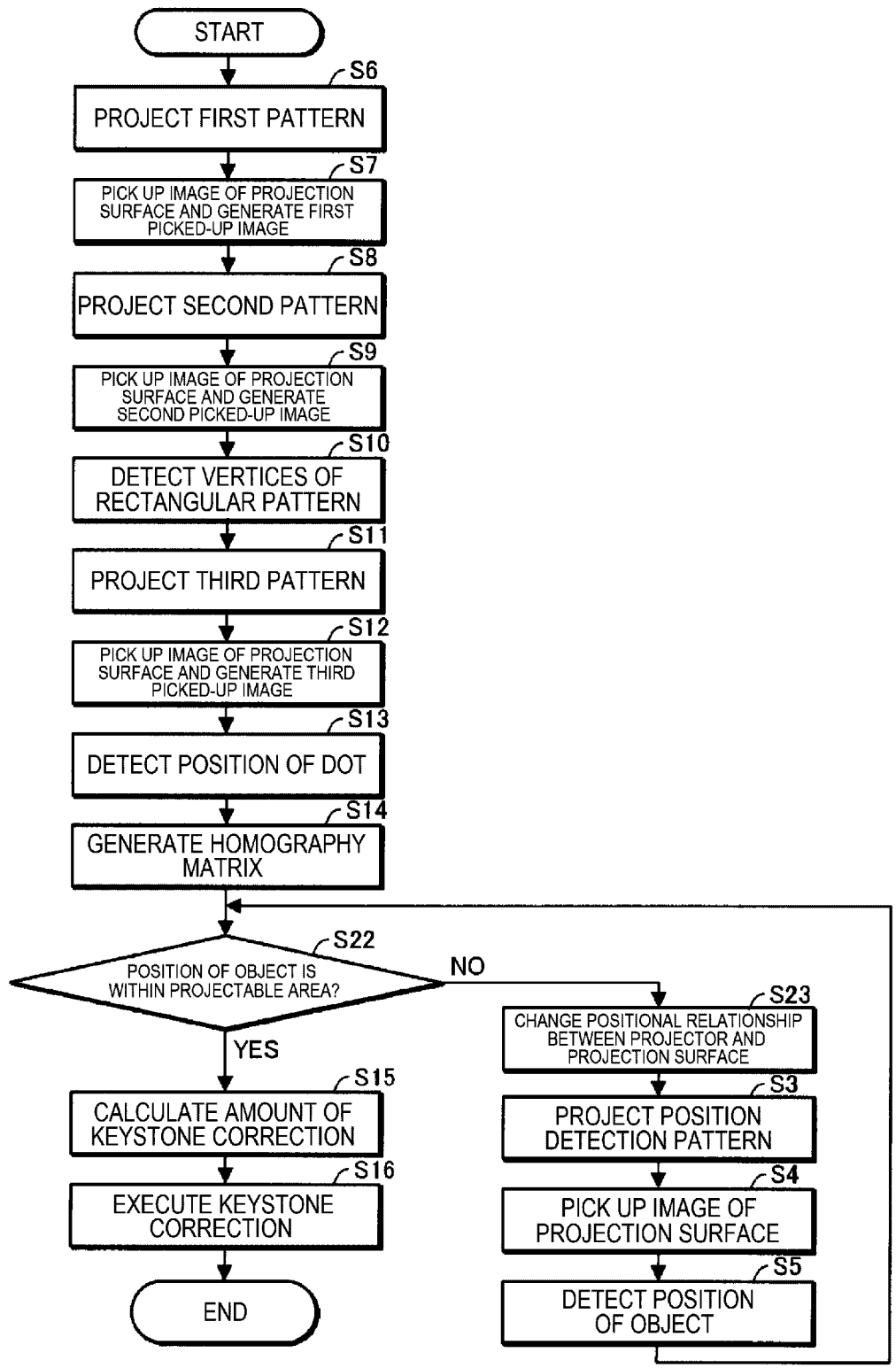

PROJECTOR AND METHOD FOR CONTROLLING PROJECTOR

CROSS-REFERENCE

The entire disclosure of Japanese Patent Application No. 2017-057144, filed Mar. 23, 2017 is expressly incorporated by reference herein.

BACKGROUND

1. Technical Field

The present invention relates to a projector and a method for controlling a projector.

2. Background Art

JP-A-2006-60447 describes a projector which corrects a keystone distortion of a projection image. On receiving an instruction transmitted in response to a remote controller operation by a user, the projector described in PTL 1 detects a frame of a screen to be a projection surface and executes keystone correction so that a projection image fits within the frame (projection area).

Incidentally, it is conceivable that a projection area for a projection image is set on a projection surface, using an object (for example, a member with a magnet) removably arranged at the projection surface.

In this case, the user of the projector described in JP-A-2006-60447 needs to operate the remote controller every time the user sets a projection area on the projection surface using the object, and this takes time and effort. Also, when the positional relationship between the projection surface and the projector changes, the user needs to operate the remote controller and this takes time and effort.

In view of the foregoing circumstances, it is an object of the invention to provide a technique that can reduce the time and effort of the user to project the projection image in the projection area on the projection surface.

SUMMARY

Solution to Problem

A projector according to an aspect of the invention includes: a projection unit projecting a projection image onto a projection surface; an image pickup unit picking up an image of the projection surface and generating a picked-up image; a detection unit detecting a position of a removable object arranged at the projection surface, based on the picked-up image; and an adjustment unit adjusting a projection position of the projection image on the projection surface, based on the position of the object.

According to this aspect, the projection position can be automatically adjusted according to the position of the removable object arranged at the projection surface. Therefore, the time and effort of the user to project the projection image in the projection area on the projection surface can be reduced.

In the projection according to the above aspect, it is desirable that the detection unit further detects a movement of the object on the picked-up image, based on the picked-up image, and that the adjustment unit adjusts the projection position when a movement of the object on the picked-up image is detected.

When the position of the projector or the projection surface shifts, the relative positional relationship between the projector and the projection surface changes and therefore the projection position of the projection image on the projection surface shifts. Also, when the relative positional relationship between the projector and the projection surface changes, the object moves on the picked-up image.

According to this aspect, the projection position is adjusted when a movement of the object of the picked-up image is detected. Therefore, according to this aspect, the projection position can be automatically adjusted when the projection position shifts on the projection surface.

In the projector according to the above aspect, it is desirable that the detection unit detects a position of a plurality of removable objects arranged at the projection surface, and that the adjustment unit decides a projection range of the projection image, based on the position of the plurality of objects, and adjusts the projection position so that the projection image is projected within the projection range. According to this aspect, the projection image can be projected in the projection range decided based on the position of the plurality of objects.

In the projector according to the above aspect, it is desirable that the adjustment unit adjusts the projection position by controlling driving of a position changing unit changing the projection position. According to this aspect, the projection position can be adjusted using the position changing unit.

In the projector according to the above aspect, it is desirable that the position changing unit changes the projection position by changing a projection direction of the projection image. According to this aspect, the projection position can be adjusted by changing the projection direction of the projection image.

In the projector according to the above aspect, it is desirable that the projection unit has a projection lens and a lens shift unit shifting the projection lens into a direction intersecting with an optical axis of the projection lens, and that the position changing unit is the lens shift unit. According to this aspect, the projection position can be adjusted using the lens shift unit.

In the projector according to the above aspect, it is desirable that the position changing unit changes the projection position by shifting the projection unit. According to this aspect, the projection position can be adjusted by shifting the projection unit.

In the projector according to the above aspect, it is desirable that the position changing unit changes the projection position by rotating the projection unit. According to this aspect, the projection position can be adjusted by rotating the projection unit.

In the projector according to the above aspect, it is desirable that the projection unit has a zoom lens and a lens drive unit changing a zoom state of the zoom lens, and that the position changing unit is the lens drive unit. According to this aspect, the projection position can be adjusted by changing the zoom state of the zoom lens.

In the projector according to the above aspect, it is desirable that the adjustment unit adjusts the projection position by adjusting image information representing the projection image. According to this aspect, the projection position can be adjusted by adjusting the image information.

In the projector according to the above aspect, it is desirable that the object is a retroreflective member. Light reflected off the retroreflective member is reflected in the direction of incident light. Therefore, the image pickup unit provided along with the projection unit in the projector receives this reflected light more easily. Therefore, according to this aspect, the object is displayed in the picked-up image more easily and the position of the object is detected more easily.

A method for controlling a projector according to an aspect of the invention includes: a step of projecting a projection image onto a projection surface; a step of picking up an image of the projection surface and generating a picked-up image; a step of detecting a position of an object removably arranged at the projection surface, based on the picked-up image; and a step of adjusting a projection position of the projection image on the projection surface, based on the position of the object.

According to this aspect, the time and effort of the user to project the projection image in the projection area on the projection surface can be reduced.

BRIEF DESCRIPTION OF DRAWINGS

FIG. 1 is a view showing a projector 1 according to a first embodiment to which the invention is applied.

FIG. 2 is a view showing an example of a support device 3.

FIG. 3 is a view schematically showing the projector 1.

FIG. 4 is a view showing an example of an image pickup unit 108.

FIG. 5 is a view showing an installation guide image I1.

FIG. 6 is a view showing a position detection pattern I2.

FIG. 7 is a view showing a first pattern I3.

FIG. 8 is a view showing a second pattern I4.

FIG. 9 is a view showing a third pattern I5.

FIG. 10 is a flowchart for explaining an operation that takes place when the power is turned on.

FIG. 11 is a view showing a circumstance where a projection surface 5 is installed on a blackboard 8.

FIG. 12 is a view showing the projection surface 5 where an object 7 is arranged.

FIG. 13 is a view showing a projection example of the installation guide image I1.

FIG. 14 is a view showing a state where manual adjustment is completed.

FIG. 15 is a view showing a projection example of the position detection pattern I2.

FIG. 16 is a view showing a projection example of the first pattern I3.

FIG. 17 is a view showing a projection example of the second pattern I4.

FIG. 18 is a view showing a projection example of the third pattern I5.

FIG. 19 is a view showing an example where a projection image is projected in a projection area 6.

FIG. 20 is another example where a projection image is projected in the projection area 6.

FIG. 21 is still another example where a projection image is projected in the projection area 6.

FIG. 22 is a flowchart for explaining tracking processing.

FIG. 23 is a view showing a circumstance where the projection surface 5 is rotated.

FIG. 24 is a view showing a picked-up image when the projection surface 5 is rotated.

FIG. 25 is a flowchart showing an operation in the case of performing tracking processing instead of manual adjustment.

DESCRIPTION OF EMBODIMENTS

Hereinafter, an embodiment according to the invention will be described with reference to the drawings. In the drawings, the dimension and scale of each part are different from the actual dimension and scale, according to need. Also, the embodiment described below is a preferred specific example of the invention. Therefore, the embodiment includes various technically preferable limitations. However, the scope of the invention is not limited to these forms unless the following explanation includes any particular description that limits the invention.

First Embodiment

FIG. 1 is a view showing a projector 1 according to a first embodiment to which the invention is applied. The projector 1 is supported by a support device 3 installed at a ceiling 2. Also, the support device 3 may be installed at a wall or the like, instead of the ceiling 2.

FIG. 2 is a view showing an example of the support device 3. The support device 3 includes a base unit 31, a first arm unit 32, a second arm unit 33, a holding unit 34, an arm drive unit 35, and a rotational drive unit 36.

The base unit 31 is fixed to the ceiling 2 and supports the first arm unit 32. The second arm unit 33 is configured to be slidable in directions of an arrow E (directions of the optical axis of a projection image from the projector 1) in relation to the first arm unit 32. The first arm unit 32 is provided with the arm drive unit 35 adjusting the amount of sliding of the second arm unit 33. The driving by the arm drive unit 35 is controlled by the projector 1. The arm drive unit 35 is an example of a position changing unit changing the projection position of the projection image from the projector 1 by shifting the projector 1 (particularly a projection unit 104). The second arm unit 33 supports the holding unit 34 holding the projector 1. The holding unit 34 is configured to be rotatable in directions of an arrow F about an axis 34a as a rotation axis. The second arm unit 33 is provided with the rotational drive unit 36 adjusting the amount of rotation of the holding unit 34. The driving by the rotational drive unit 36 is controlled by the projector 1. The rotational drive unit 36 is an example of a position changing unit changing the projection position by changing the projection direction of the projection image from the projector 1. Moreover, the rotational drive unit 36 is an example of a position changing unit changing the projection position of the projection image from the projector 1 by rotating the projector 1 (particularly the projection unit 104).

The projector 1 controls the driving of the arm drive unit 35 and the rotational drive unit 36 of the support device 3 and thus can adjust the attitude of the projector 1. Back to FIG. 1, the projector 1 receives image information from a PC (personal computer) 4 and projects a projection image corresponding to the image information, from the projection unit 104 onto a projection surface 5.

The projection surface 5 is, for example, a projection surface of a magnet screen. The magnet screen has a projection surface and a magnet surface opposite each other. As a form of using the magnet screen, a projection image is projected form the projector 1 onto the projection surface of the magnet screen in the state where the magnet surface is posted on a blackboard or the like. Also, the projection surface 5 is not limited to the projection surface of the magnet screen and may be, for example, a whiteboard and can be changed according to need.

The user arranges an object 7 at the projection surface 5 and thus sets a projection area 6 where the user wants to project a projection image onto the projection surface 5. In FIG. 1, a quadrilateral projection area 6 is set based on four objects 7. Specifically, an object 7 is arranged at the position of each of the four vertices A to D of the projection area 6. The object 7 is removable from the projection surface 5. In this embodiment, a retroreflective member having a magnet is used as the object 7. Also, the object 7 is not limited to the retroreflective member having a magnet and can be changed according to need.

The projector 1 picks up, by an image pickup unit 108, an image of the projection surface 5 where the object 7 is arranged, and generates a picked-up image. The projector 1 detects the position of the object 7 arranged at the projection surface 5, based on the picked-up image. The projector 1 decides the projection area 6 based on the position of the object 7 and projects a projection image in the projection area 6.

For example, when the projector 1 repeatedly generates a picked-up image and detects a movement of the object 7 on the picked-up image (for example, when the projector 1, the projection surface 5 or the object 7 is moved), the projector 1 decides the projection area 6 based on the position of the object 7 after the movement, and projects a projection image in the projection area 6.

As a technique for projecting a projection image in the projection area 6, a technique in which the projector 1 controls both or one of the arm drive unit 35 and the rotational drive unit 36 of the support device 3 to change the position or attitude of the projector 1 in relation to the projection surface 5 and thus projects a projection image in the projection area 6 may be employed.

As another technique, a technique in which the projector 1 executes keystone correction to a projection image so that the projection image is projected in the projection area 6 may be employed.

FIG. 3 is a view schematically showing the projector 1.

The projector 1 includes an operation unit 101, an image processing unit 102, a light valve drive unit 103, a projection unit 104, a light source drive unit 105, a lens drive unit 106, a lens shift unit 107, an image pickup unit 108, a storage unit 109, a control unit 110, and a bus 111. The image processing unit 102 includes an image combining unit 102a and a keystone correction unit 102b. The projection unit 104 includes a light source 11, three liquid crystal light valves 12 (12R, 12G, 12B) as an example of a light modulation device, and a projection system 13. The projection system 13 includes a zoom lens 13a and a projection lens 13b. The optical axis of the zoom lens 13a coincides with the optical axis of the projection lens 13b. In FIG. 3, the optical axis of the zoom lens 13a and the optical axis of the projection lens 13b are shown as an "optical axis 13c".

The operation unit 101 is, for example, various operation buttons or operation keys, or a touch panel. The operation unit 101 receives an input operation by the user. Also, the operation unit 101 may be a remote controller or the like transmitting information corresponding to an input operation, wirelessly or via a wire. In this case, the projector 1 has a reception unit receiving the information transmitted from the remote controller. The remote controller has various operation buttons or operation keys, or a touch panel to accept an input operation.

The image processing unit 102 performs image processing on image information and generates an image signal. For example, the image processing unit 102 performs image processing on image information (hereinafter also referred to as "received image information") received from the PC 4 (see FIG. 1) and generates an image signal.

The image combining unit 102a combines a plurality of pieces of image information together or outputs a single piece of image information. Specifically, the image combining unit 102a combines together or outputs image information written into an image memory (hereinafter also referred to as a "layer"). The layer may be or may be not built in the image combining unit 102a.

The image combining unit 102a has two layers, specifically, a first layer and a second layer. In the first layer, for example, the received image information is written. In the second layer, for example, installation guide image information representing an image for guiding the installation of the projector 1 (hereinafter referred to as an "installation guide image"), position detection pattern information (image information) representing a pattern for detecting the position of the object 7, and matrix generation pattern information (image information) representing a pattern for generating a homography matrix are selectively written. In this embodiment, first to third pattern information is used as the matrix generation pattern information. The homography matrix will be described later.

When image information is written in the first layer and image information is not written in the second layer, the image combining unit 102a outputs the image information written in the first layer. When image information is not written in the first layer and image information is written in the second layer, the image combining unit 102a outputs the image information written in the second layer. When image information is written in both the first layer and the second layer, the image combining unit 102a combines together the image information written in the first layer and the image information written in the second layer, thus generates combined image information, and outputs the combined image information (image information).

The keystone correction unit 102b performs keystone correction to the image information outputted from the image combining unit 102a and generates an image signal. When not performing keystone correction to the image information outputted from the image combining unit 102a, the keystone correction unit 102b generates an image signal corresponding to the image information outputted from the image combining unit 102a.

The light valve drive unit 103 drives the liquid crystal light valve 12 (12R, 12G, 12B), based on the image signal.

The projection unit 104 projects a projection image onto the projection surface 5. In the projection unit 104, the liquid crystal light valve 12 modulates light emitted from the light source 11 and thus forms projection image light (projection image), and this projection image light is projected in an enlarged form from the projection system 13.

The light source 11 is a xenon lamp, ultra-high-pressure mercury lamp, LED (light-emitting diode), or laser light source or the like. The light emitted from the light source 11 is reduced in luminance distribution variation by an optical integration system, not illustrated, and is subsequently separated into color light components of red (R), green (G), and blue (B), which are the primary colors of light, by a color separation system, not illustrated. The color light components of R, G, B become incident on the liquid crystal light valves 12R, 12G, 12B, respectively.

The liquid crystal light valve 12 is formed of a liquid crystal panel or the like having a liquid crystal enclosed between a pair of transparent substrates. In the liquid crystal light valve 12, a rectangular pixel area 12a made up of a plurality of pixels 12p arranged into a matrix is formed. In the liquid crystal light valve 12, a drive voltage can be applied to the liquid crystal at each pixel 12p. As the light valve drive unit 103 applies, to each pixel 12p, a drive voltage corresponding to the image signal inputted from the image processing unit 102, each pixel 12p is set to a light transmittance corresponding to the image signal. Therefore, the light emitted from the light source 11 is modulated by being transmitted through the pixel area 12a, and thus forms an image corresponding to the image signal for each color light.

The images of the respective colors are combined together at each pixel area 12a by a light combining system, not illustrated, thus generating projection image light (projection image) which is color image light (color image). The projection image light is projected in an enlarged form onto the projection surface 5 by the projection system 13.

The light source drive unit 105 drives the light source 11. For example, when the operation unit 101 receives a power-on operation, the light source drive unit 105 causes the light source 11 to emit light.

The lens drive unit 106 changes the zoom state of the zoom lens 13a. Specifically, the lens drive unit 106 moves the zoom lens 13a in directions G along the optical axis 13c and thus changes the zoom state of the zoom lens 13a. The lens drive unit 106 is an example of the position changing unit.

The lens shift unit 107 can shift the projection system 13, more specifically the projection lens 13b, in directions H intersecting with the optical axis 13c (for example, directions orthogonal to the optical axis 13c). The lens shift unit 107 can also shift the projection lens 13b in a direction perpendicular to both the optical axis 13c and the directions H. The lens shift unit 107 is an example of the position changing unit changing the projection position by changing the projection direction of the projection image.

The image pickup unit 108 picks up an image of the projection surface 5 and generates a picked-up image.

FIG. 4 is a view showing an example of the image pickup unit 108. The image pickup unit 108 is a camera having an optical system 21 such as lens and an image pickup element 22 or the like converting light condensed by the optical system 21 into an electrical signal. The image pickup element 22 is, for example, a CCD (charge-coupled device) image sensor or CMOS (complementary metal-oxide semiconductor) image sensor. The image pickup unit 108 repeatedly picks up an image of the projection surface 5 and generates picked-up images in time series.

Back to FIG. 3, the storage unit 109 is a computer-readable recording medium. The storage unit 109 stores a program prescribing an operation of the projector 1 and various kinds of information (for example, image information used by the image combining unit 102a). The image information used by the image combining unit 102a is, for example, the installation guide image information, the position detection pattern image information, and the first to third pattern information. These pieces of information are not limited to being stored in advance in the storage unit 109 but may be generated each time by a program.

FIG. 5 is a view showing an installation guide image I1 corresponding to the installation guide image information. In an area I1a in the installation guide image I1, guide information guiding the user in the installation of the projector 1 is shown.

FIG. 6 is a view showing a position detection pattern corresponding to the position detection pattern image information. The position detection pattern I2 is used to detect the object 7 arranged at the projection surface 5. The position detection pattern image is, for example, an entirely white image.

FIG. 7 is a view showing a first pattern I3 corresponding to the first pattern information. In the first pattern I3, a white rectangular pattern I3b is superimposed on a black background I3a. FIG. 8 is a view showing a second pattern I4 corresponding to the second pattern information. The second pattern I4 is an entirely black image. FIG. 9 is a view showing a third pattern I5 corresponding to the third pattern information. In the third pattern I5, a white dot I5b is superimposed at the same positions as the four vertices of the rectangular pattern I3b shown in FIG. 7, on a black background I5a.

The first pattern I3, the second pattern I4, and the third pattern I5 are used to generate a homography matrix. The homography matrix is a matrix for performing homography transformation of an image on the liquid crystal light valve 12 into a picked-up image. That is, the homography matrix is information establishing a position correspondence between a projection image projected by the projection unit 104 and a picked-up image of the projection image.

Back to FIG. 3, the control unit 110 is a computer such as a CPU (central processing unit). The control unit 110 reads and executes a program stored in the storage unit 109 and thus implements a projection control unit 41, an image pickup control unit 42, a position detection unit 43, an adjustment unit 44, and a transformation matrix generation unit 45.

The projection control unit 41 controls the light source drive unit 105 to control the projection of a projection image by the projection unit 104. The image pickup control unit 42 controls the image pickup by the image pickup unit 108.

The position detection unit 43 detects the position of the object 7 arranged at the projection surface 5, based on a picked-up image. The position detection unit 43 also detects a movement of the object 7 on the picked-up image, based on the picked-up image. The position detection unit 43 is an example of the detection unit.

The adjustment unit 44 adjusts the projection position of a projection image on the projection surface 5, based on the position of the object 7. For example, when a movement of the object 7 is detected, the adjustment unit 44 adjusts the projection position of the projection image on the projection surface 5, based on the position of the object 7 after the movement. The adjustment unit 44 controls the operation of the keystone correction unit 102b, the lens drive unit 106, the lens shift unit 107, the arm drive unit 35 (see FIG. 2), or the rotational drive unit 36 (see FIG. 2), and thus adjusts the projection position of the projection image on the projection surface 5. For example, the adjustment unit 44 adjusts the amount of correction by the keystone correction unit 102b and thus adjusts the image information and adjusts the projection position.

The transformation matrix generation unit 45 generates a homography matrix. The transformation matrix generation unit 45 stores the homography matrix into the storage unit 109.

Next, an operation will be described.

First, an operation at the time of turning on the power will be described. FIG. 10 is a flowchart for explaining an operation when the power is turned on. Hereinafter, it is assumed that image information is not written in the first layer.

In the circumstance where the projection surface 5 such as a magnet screen is installed at the blackboard 8, as shown in FIG. 11, the user arrange a plurality of objects 7 (in this embodiment, four objects 7) for setting the projection area 6, at the projection surface 5 (see FIG. 12).

Subsequently, the user operates the operation unit (for example, remote controller) 101 of the projector 1 supported by the support device 3, to turn on the power of the projector 1. As the projector 1 starts with the power turned on, the projection control unit 41 controls the light source drive unit 105 to turn on the light source 11.

Subsequently, the user operates the operation unit 101 to input a correction start instruction to start automatic adjustment of the projection position. As the correction start instruction is inputted, the adjustment unit 44 reads the installation guide image information from the storage unit 109, writes the installation guide image information into the second layer, and also switches the amount of correction by the keystone correction unit 102b to zero. Thus, the image processing unit 102 generates an image signal corresponding to the installation guide image information, and the projection unit 104 projects the installation guide image I1 (see FIG. 5) according to this image signal, onto the projection surface 5 (step S1).

FIG. 13 is a view showing a projection example of the installation guide image I1. For example, when a shaded area in the installation guide image I1 is "blue", information telling the user to "adjust the position of the projector or the like so that the object comes within the blue part" is used as guide information shown in the area I1a. The guide information can be changed according to need. Also, in FIG. 13, a keystone distortion is generated in the installation guide image I1 due to the relative positional relationship between the projector 1 and the projection surface 5.

The user manually adjusts the direction or the position of the projector 1 or the position of the object 7 according to the guide information. FIG. 14 is a view showing the state where the manual adjustment is completed.

On finishing the manual adjustment, the user operates the operation unit 101 to input an execution start instruction. When the operation unit 101 receives the execution start instruction (YES in step S2), the adjustment unit 44 starts the projection of each pattern and the detection of each pattern in order to automatically adjust the projection position.

First, the adjustment unit 44 reads the position detection pattern information from the storage unit 109 and writes the position detection pattern information into the second layer. Thus, the image processing unit 102 generates an image signal corresponding to the position detection pattern information, and the projection unit 104 projects the position detection pattern I2 (see FIG. 6) according to this image signal, onto the projection surface 5 (step S3).

FIG. 15 is a view showing a projection example of the position detection pattern I2. The position detection pattern I2 is used to detect the light reflected off the object 7. In this embodiment, a white image is used as the position detection pattern I2 in order to facilitate the detection of the reflected light from the object 7.

Subsequently, the image pickup control unit 42 causes the image pickup unit 108 to pick up an image of the projection surface 5 and generate a picked-up image (step S4). At this time, the image pickup control unit 42 performs exposure control so that the picked-up image is generated with proper brightness.

Subsequently, the position detection unit 43 analyzes the picked-up image and detects the position of the object 7 on the picked-up image (step S5). In step S5, the following processing is executed.

The object 7 has a retroreflective member. Therefore, the object 7 has a higher luminance than its peripheries on the picked-up image. Therefore, the position detection unit 43 detects an area with a higher luminance than its peripheries on the picked-up image, as an "area where the object 7 exists". Subsequently, the position detection unit 43 detects a centroid position (centroid coordinates) of the "area where the object 7 exists", as the "position of the object 7".

Also, it is desirable that the object 7 has such a shape and reflection characteristic that the detection accuracy for the centroid position is higher (for example, circular as viewed in a plane view and having a reflectance increasing as it approaches the centroid position).

Also, the position of the object 7 is not limited to the centroid position of the object 7 and can be changed according to need. For example, when the object 7 is polygonal, a vertex of the object 7 may be used as the position of the object 7. Also, when the object 7 has a solid shape with a certain thickness (sphere, rectangular parallelepiped or the like), the position of the object 7 may be found in consideration of an offset amount corresponding to the thickness.

On completion of step S5, the transformation matrix generation unit 45 reads the first pattern information from the storage unit 109 and writes the first pattern information into the second layer. Thus, the image processing unit 102 generates an image signal corresponding to the first pattern information, and the projection unit 104 projects the first pattern I3 (see FIG. 7) according to this image signal, onto the projection surface 5 (step S6). FIG. 16 is a view showing a projection example of the first pattern I3.

Subsequently, the image pickup control unit 42 causes the image pickup unit 108 to pick up an image of the projection surface 5 and generate a first picked-up image (step S7). Subsequently, the image pickup unit 108 outputs the first picked-up image to the transformation matrix generation unit 45.

Subsequently, the transformation matrix generation unit 45 reads the second pattern information from the storage unit 109 and writes the second pattern information into the second layer. Thus, the image processing unit 102 generates an image signal corresponding to the second pattern information, and the projection unit 104 projects the second pattern I4 (see FIG. 8) according to this image signal, onto the projection surface 5 (step S8). FIG. 17 is a view showing a projection example of the second pattern I4.

Subsequently, the image pickup control unit 42 causes the image pickup unit 108 to pick up an image of the projection surface 5 and generate a second picked-up image (step S9). Subsequently, the image pickup unit 108 outputs the second picked-up image to the transformation matrix generation unit 45.

Subsequently, the transformation matrix generation unit 45 takes a difference between the first picked-up image and the second picked-up image and detects the rectangular pattern I3b. Subsequently, the transformation matrix generation unit 45 detects the positions of the four vertices of the rectangular pattern I3b on the picked-up image (step S10).

Subsequently, the transformation matrix generation unit 45 reads the third pattern information from the storage unit 109 and writes the third pattern information into the second layer. Thus, the image processing unit 102 generates an image signal corresponding to the third pattern information, and the projection unit 104 projects the third pattern I5 (see FIG. 9) according to this image signal, onto the projection surface 5 (step S11). FIG. 18 is a view showing a projection example of the third pattern I5.

Subsequently, the image pickup control unit 42 causes the image pickup unit 108 to pick up an image of the projection surface 5 and generate a third picked-up image (step S12). Subsequently, the image pickup unit 108 outputs the third picked-up image to the transformation matrix generation unit 45.

Subsequently, the transformation matrix generation unit 45 detects an "area where the dot I5b exists" for each dot I5b, using the positions of the four vertices detected in step S10 as a search start position for the dot I5b in the third picked-up image. Subsequently, the transformation matrix generation unit 45 detects the centroid position (centroid coordinates) of the "area where the dot I5b exists" for each dot I5b, as the "position of the dot I5b" (step S13). In this way, the transformation matrix generation unit 45 detects the centroid of a dot that can be detected with high accuracy, based on the vertices of the rectangular pattern that can be easily detected. Therefore, the transformation matrix generation unit 45 can specify a predetermined position swiftly with high accuracy.

Subsequently, the transformation matrix generation unit 45 calculates a homography matrix, based on the positional relationship between the centroid coordinates of the four dots I5b specified by the third pattern information and the centroid coordinates of the four dots I5b in the picked-up image (step S14). Subsequently, the transformation matrix generation unit 45 stores the homography matrix into the storage unit 109. Meanwhile, when the positional accuracy need not be so high, a homography matrix may be calculated based on the positions of the four vertices of the rectangular pattern I3b, without using the third pattern I5 (dots I5b). Also, a cross mark or the like instead of the dot I5b may be arranged in the third pattern I5, and a homography matrix may be calculated based on the position of the point of intersection.

Subsequently, the position detection unit 43 calculates the inverse matrix of the homography matrix and transforms the position of the object 7 on the picked-up image into the position on the liquid crystal light valve 12, using this matrix.

Subsequently, the adjustment unit 44 decides a quadrilateral area having its vertices at the positions of the four objects 7 on the liquid crystal light valve 12 (area corresponding to the projection area 6 on the liquid crystal light valve 12), as the projection range of a projection image. Subsequently, the adjustment unit 44 calculates an amount of keystone correction to fit the projection image within the projection range of the projection image (step S15).

Subsequently, the adjustment unit 44 sets the amount of keystone correction calculated in step S15, in the keystone correction unit 102b. As the amount of keystone correction is set, the keystone correction unit 102b executes keystone correction to the output (image information) from the image combining unit 102a, based on the amount of keystone correction (step S16). Therefore, the projection image (for example, image corresponding to a received image) is projected in the projection area 6 specified by the positions of the objects 7, for example, as shown in FIG. 19.

Also, in step S15, the adjustment unit 44 may calculate the amount of keystone correction to fit the projection image within the projection area while maintaining the aspect ratio of the projection image based on the image information. For example, the adjustment unit 44 calculates the amount of keystone correction in such a way that an area 6a where a projection image P does not exist, in the projection area 6 within which the entirety of the projection image P fits, is displayed in black, as shown in FIG. 20. In this case, a distortion of the aspect ratio of the projection image P can be restrained.

Also, the adjustment unit 44 may calculate the amount of keystone correction in such a way that the projection image P is projected in the entirety of the projection area 6 while maintaining the aspect ratio of the projection image P, for example, as shown in FIG. 21. In this case, the adjustment unit 44 calculates the amount of keystone correction in such a way that the height of the projection image P and the height of the projection area 6 coincide with each other or the width of the projection image P and the width of the projection area 6 coincide with each other. In this case, the size of the projection image P can be increased while restraining a distortion of the aspect ratio of the projection image P. As for which one of the forms of FIGS. 19 to 21 should be used to project the projection image P, it is desirable that the user can select by a menu operation or the like before or after starting automatic adjustment of the projection position.

Next, processing to decide the projection area 6 based on the position of the object 7 after a movement and project a projection image in the projection area 6, when the movement of the object 7 on the picked-up image is detected (for example, when the projector 1, the projection surface 5, or the object 7 is moved) (hereinafter referred to as "tracking processing") will be described. Hereinafter, it is assumed that the projector 1 has a tracking mode in which the tracking processing is executed.

FIG. 22 is a flowchart for explaining the tracking processing. Of the processing shown in FIG. 22, processing similar to the processing shown in FIG. 10 is denoted by the same reference signs. Hereinafter, different processing from the processing shown in FIG. 10, of the processing shown in FIG. 22, will be mainly described.

When the operation unit 101 receives an input operation to turn on the tracking mode, the tracking processing shown in FIG. 22 is periodically executed. As for the cycle (frequency) of the tracking processing, for example, the user may be enabled to decide a desired cycle by a menu operation or the like, from among hourly basis, daily basis, weekly basis, or monthly basis or the like.

The position detection unit 43 detects the object 7 from the picked-up image generated by the image pickup unit 108, compares the position of the object 7 detected in the present tracking processing with the position of the object 7 detected in the previous tracking processing, and determines whether the object 7 has moved or not (step S21). In the first tracking processing after the tracking mode is turned on, there is no previous picked-up image and therefore the position detection unit 43 determines that the object 7 has not moved. Alternatively, a configuration to execute the processing shown in FIG. 10 and store the initial position of the object 7 when the tracking mode is turned on may be employed. In step S21, the following processing is executed.

When the magnet screen (projection surface 5) is moved, the projector 1 is moved, or the position of the object 7 on the projection surface 5 is moved and the movement of the position of each of the four objects 7 on the picked-up image exceeds a predetermined threshold, the position detection unit 43 determines that the object 7 has moved. As the threshold to determine the movement of the object 7, different thresholds may be employed according to the position of the object 7.

Meanwhile, when the movement of the position of at least one of the four objects 7 on the picked-up image does not exceed the predetermined threshold, the position detection unit 43 determines that there is no movement of the object 7.

Therefore, for example, even when the object 7 moves within a range equal to or below the predetermined threshold on the picked-up image due to vibration or the like of the projection surface 5, the position detection unit 43 determines that the object 7 has not practically moved.

Also, for example, when a person passes between the object 7 and the projector 1, and because of its influence, a part of the object 7 cannot be detected or only the amount of movement of a part of the object 7 exceeds the predetermined threshold, the position detection unit 43 determined that the object 7 has not practically moved.

Also, the position detection unit 43 may determine that the object 7 has moved, when the amount of movement of the object 7 exceeds the predetermined threshold a predetermined number of times consecutively. Thus, for example, when the position of the object 7 is moved on the picked-up image by temporary vibration, it can be determined that the object 7 has not practically moved.

Also, the position detection unit 43 may determine whether the object 7 has moved on the picked-up image or not, by another technique (for example, a combination of the above techniques). For example, when the movement of the positions of at least two objects 7 exceeds the predetermined threshold, the position detection unit 43 may determine that the object 7 has moved.

When the position detection unit 43 does not detect any movement of the object 7 (NO in step S21), the present tracking processing ends.

Meanwhile, the position detection unit 43 detects a movement of the object 7 (YES in step S21), processing to generate a homography matrix is executed first (steps S6 to S14).

Subsequently, the adjustment unit 44 determines whether the position of the object 7 is within a projectable area or not (step S22).

Specifically, the adjustment unit 44 first estimates the position of the pixel area 12a (projectable area) of the liquid crystal light valve 12 on the picked-up image, based on the newly generated homography matrix. Subsequently, when the position of the object 7 is included in the pixel area 12a (projectable area) on the picked-up image, the adjustment unit 44 determines that the position of the object 7 is within the projectable area.

Meanwhile, when the position of the object 7 is not included in the pixel area 12a (projectable area) on the picked-up image, the adjustment unit 44 determines that the position of the object 7 is outside the projectable area.

When the position of the object 7 is within the projectable area (YES in step S22), steps S15 and S16 are executed and the projection image is projected in the projection area 6.

When the position of the object 7 is outside the projectable area (NO in step S22), keystone correction to the projection image cannot make the projection image fit in the projection area 6.

Thus, the adjustment unit 44 drives at least one of the lens drive unit 106, the lens shift unit 107, the arm drive unit 35, and the rotational drive unit 36 according to the movement of the object 7 on the picked-up image and thus changes the positional relationship between the projector 1 and the projection surface 5 (step S23).

For example, when it is determined that the object 7 is translated, based on the picked-up image, the adjustment unit 44 drives the lens shift unit 107 in such a way that the projection lens 13b moves in a direction corresponding to the movement by an amount corresponding to the amount of movement.

When the distance between the projector 1 and the object 7 becomes shorter and the spacing between the respective objects 7 on the picked-up image expands, the adjustment unit 44 drives both or one of the arm drive unit 35 and the lens drive unit 106 in such a way that the spacing between the respective objects 7 on the picked-up image becomes narrower by the amount of expansion (the distance between the projector 1 and the object 7 becomes longer).

Meanwhile, when the distance between the projector 1 and the object 7 becomes longer and the spacing between the respective objects 7 on the picked-up image becomes narrower, the adjustment unit 44 drives both or one of the arm drive unit 35 and the lens drive unit 106 in such a way that the spacing between the respective objects 7 on the picked-up image expands. To give an example, when the spacing between the respective objects 7 on the picked-up image becomes narrower, the adjustment unit 44 drives both or one of the arm drive unit 35 and the lens drive unit 106 in such a way that the spacing between the respective objects 7 on the picked-up image expands by a predetermined amount (the distance between the projector 1 and the object 7 becomes shorter).

Also, when the projection surface 5 rotates as shown in FIG. 23 and the distance between an object 7a and an object 7d becomes longer and the distance between an object 7b and an object 7c becomes shorter in a picked-up image 9 as shown in FIG. 24, the adjustment unit 44 drives the rotational drive unit 36 in such a way that the distance between the object 7a and the object 7d becomes shorter and the distance between the object 7b and the object 7c becomes longer in the picked-up image 9.

As the positional relationship between the projector 1 and the projection surface 5 is changed, steps S3 to S5 are executed. Subsequently, the processing returns to step S22.

According to the projector 1 and the method for controlling the projector 1 in this embodiment, the projection position can be automatically adjusted according to the position of the removable object 7 arranged at the projection surface 5. Also, even when the positional relationship between the projector 1 and the projection surface 5 changes, the projection position can be automatically aligned with the projection area. Therefore, the time and effort of the user can be reduced.

Modification Examples

The invention is not limited to the above embodiment. For example, various modifications as described below can be made. Also, one a plurality of modifications arbitrarily selected from the following modifications can be combined according to need.

Modification Example 1

The position detection unit 43 may detect the amount of movement of the object 7 on the picked-up image. In this case, the adjustment unit 44 may, in step S23, drive at least one of the lens drive unit 106, the lens shift unit 107, the arm drive unit 35, and the rotational drive unit 36 in such a way that the projection unit 104 moves by an amount corresponding to the amount of movement of the object 7 on the picked-up image.

Modification Example 2

Although keystone correction is carried out using a homography matrix in the above embodiment, control may be performed in such a way as to drive the arm drive unit 35 and the rotational drive unit 36 little by little until the positional relationship between the position of the object 7 and the four vertices of the projection image becomes a predetermined positional relationship, based on the picked-up image.

Modification Example 3

Although a configuration having the lens drive unit 106 changing the zoom state of the zoom lens 13*a* and the lens shift unit 107 shifting the projection lens 13*b* is described as an example of the position changing unit in the above embodiment, the projection position may be changed by the image processing unit 102. For example, the image processing unit 102 may perform digital zoom in which an image is reduced by forming the image in a smaller range than the pixel area 12*a* of the liquid crystal light valve 12, or digital shift in which the image reduced by digital zoom is moved within the pixel area 12*a*. However, when digital zoom is used, resolution drops and therefore it is desirable to give low priority to the adjustment by digital zoom.

Modification Example 4

Although a configuration in which the projector 1 is slid in the directions of the optical axis (front-back directions) by the arm drive unit 35 as the position changing unit is described as an example in the above embodiment, a configuration that enables sliding in left-right directions or up-down directions may be employed, and a configuration that enables sliding in a plurality of directions, of front-back directions, left-right directions, and up-down directions, may be employed.

Also, while a configuration in which the projector 1 is horizontally rotated by the rotational drive unit 36 as the position changing unit is described as an example in the above embodiment, a configuration that enables a rotation of up-down tilt or horizontal rolling may be employed, and a configuration that enables a plurality of rotations, of horizontal rotation, up-down tilt, and horizontal rolling may be employed.

Also, when both the mechanism for sliding the projector 1 and the mechanism for rotating the projector 1 are provided as in the above embodiment, it is desirable to carry out adjustment by rotation to make the projection image rectangular and subsequently carry out adjustment by sliding. Also, when the rotational drive unit 36 has a mechanism that enables rotations on three axes, that is, horizontal rotation, up-down tilt, and horizontal rolling, it is desirable to carry out adjustment by horizontal rotation and up-down tilt to make the projection image rectangular and subsequently carry out adjustment by horizontal rolling.

Also, the adjustment unit 44 may adjust the projection position by a combination of a plurality of position changing units, or may carry out adjustment using only one position changing unit.

Modification Example 5

A measuring unit that can three-dimensionally measure a tilt of the projector 1 in relation to the projection surface 5, using a technique such as triangulation, may be provided, and a configuration in which the adjustment unit 44 adjusts rotations on three axes of the projector 1 according to the measured tilt may be employed.

Modification Example 6

In the above embodiment, when the tracking mode is turned on, the tracking processing shown in FIG. 22 is periodically executed, and when a movement of the object 7 is detected in step S21, processing to adjust the projection position is carried out. However, this form is not limiting. For example, the adjustment processing shown in FIG. 10 may be periodically executed without detecting a movement of the object 7.

Modification Example 7

The number of the objects 7 may be greater than four. Particularly, when the projection surface 5 is not planar but distorted, correction corresponding to the distortion of the projection surface 5 can be carried out by arranging an object 7 at a position other than the four vertices of the projection image.

Modification Example 8

In the above embodiment, the object 7 is used to specify the projection area and is used to detect a movement on the picked-up image.

However, the object used to specify the projection area and the object used to detect a movement on the picked-up image may be separate from each other.

In this case, making the reflection characteristic of the object used to specify the projection area and the reflection characteristic of the object used to detect a movement on the picked-up image different from each other enables each object to be identified on the picked-up image.

Also, in this case, the number of the objects used to detect a movement on the picked-up image is not limited to four and can be changed according to need. The number of the objects used to specify the projection area is not limited to four, either, and may be two or more. For example, when the number of the objects used to specify the projection area is two, these two objects are installed at diagonal positions in the rectangular projection area.

Modification Example 9

To facilitate detection of the object 7, it is desirable that the object 7 has a different reflection characteristic from the reflection characteristic of the projection surface 5. Also, configuring the object 7 in such a way that its reflection characteristic can be changed by switching the reflection surface itself or by changing the optical filter or the like enables easy detection of the object 7 on various projection surfaces 5. In this case, providing the object 7 with a measure to receive a control signal via wireless communication or infrared communication and a measure to change the reflection characteristic based on the received control signal enables the user to change the reflection characteristic by a remote controller operation. Also, the projector 1 may transmit a control signal based on the picked-up image at the image pickup unit 108 to the object 7, thus automatically switching the reflection characteristic.

Modification Example 10

In the processing shown in FIG. 10, first, the installation guide image is displayed and the user manually adjusts the direction of the projector 1 or the position of the object 7 according to the guide information. This manual adjustment may be automated by performing the tracking processing shown in FIG. 22. FIG. 25 is a flowchart showing an operation example when the tracking processing shown in FIG. 22 is performed, instead of the manual adjustment. In FIG. 25, the same processing as the processing shown in FIG. 22 is denoted by the same reference signs.

Modification Example 11

When image information is stored in the storage unit 109, the image combining unit 102a may use the image information stored in the storage unit 109, instead of the received image information.

Modification Example 12

All or a part of the elements implemented by the control unit 110 executing a program may be implemented by hardware such as an electronic circuit, for example, FPGA (field-programmable gate array) or ASIC (application-specific IC) or the like, or may be implemented by a collaboration of software and hardware.

Modification Example 13

In the projection unit 104, a liquid crystal light valve is used as the light modulation device. However, the light modulation device is not limited to the liquid crystal light valve and can be changed according to need. For example, a configuration using three reflection-type liquid crystal panels may be employed as the light modulation device. Also, the light modulation device may have a configuration such as a system made up of a combination of one liquid crystal panel and a color wheel, a system using three digital mirror devices (DMD), or a system made up of a combination of one digital mirror device and a color wheel. When only one liquid crystal panel or DMD is used as the light modulation device, components equivalent to the color separation system and the light combining system are not needed. Also, other than the liquid crystal panel and the DMD, a configuration that can modulate light emitted from the light source can be employed as the light modulation device.

What is claimed is:

1. A projector comprising:
   a projection unit projecting a projection image onto a projection surface;
   an image pickup unit picking up an image of the projection surface and generating a picked-up image;
   a detection unit detecting a position of a removable object arranged at the projection surface, based on the picked-up image; and
   an adjustment unit adjusting a projection position of the projection image on the projection surface, based on the position of the object, wherein
   the detection unit further detects a movement of the object relative to the projection surface, based on the picked-up image, and
   the adjustment unit adjusts the projection position when a movement of the object on the picked-up image is detected.

2. The projector according to claim 1, wherein
   the detection unit detects a position of a plurality of removable objects arranged at the projection surface, and
   the adjustment unit decides a projection range of the projection image, based on the position of the plurality of objects, and adjusts the projection position so that the projection image is projected within the projection range.

3. The projector according to one of claim 1, wherein
   the adjustment unit adjusts the projection position by controlling driving of a position changing unit changing the projection position.

4. The projector according to claim 3, wherein
   the position changing unit changes the projection position by changing a projection direction of the projection image.

5. The projector according to claim 3, wherein
   the projection unit has a projection lens and a lens shift unit shifting the projection lens into a direction intersecting with an optical axis of the projection lens, and
   the position changing unit is the lens shift unit.

6. The projector according to claim 3, wherein
   the position changing unit changes the projection position by shifting the projection unit.

7. The projector according to claim 3, wherein
   the position changing unit changes the projection position by rotating the projection unit.

8. The projector according to claim 3, wherein
   the projection unit has a zoom lens and a lens drive unit changing a zoom state of the zoom lens, and
   the position changing unit is the lens drive unit.

9. The projector according to one of claim 1, wherein
   the adjustment unit adjusts the projection position by adjusting image information representing the projection image.

10. The projector according to one of claim 1, wherein
    the object is a retroreflective member.

11. A method for controlling a projector, the method comprising:
    projecting a projection image onto a projection surface;
    picking up an image of the projection surface and generating a picked-up image;
    detecting a position of an object removably arranged at the projection surface, based on the picked-up image; and
    adjusting a projection position of the projection image on the projection surface, based on the position of the object, wherein
    the detecting includes detecting a movement of the object relative to the projection surface, based on the picked-up image, and
    the adjusting includes adjusting the projection position when a movement of the object on the picked-up image is detected.

* * * * *